United States Patent [19]
Ullrich

[11] 4,206,181
[45] Jun. 3, 1980

[54] PRESSURE VESSEL FOR SEPARATING SULFUR FROM AN AQUEOUS SULFUR SUSPENSION

[75] Inventor: Hansjurgen Ullrich, Bochum, Fed. Rep. of Germany

[73] Assignee: Dr. C. Otto & Comp. G.m.b.H., Bochum, Fed. Rep. of Germany

[21] Appl. No.: 26,476

[22] Filed: Apr. 2, 1979

Related U.S. Application Data

[63] Continuation-in-part of Ser. No. 817,655, Jul. 21, 1977, Pat. No. 4,158,039.

[30] Foreign Application Priority Data

Apr. 12, 1978 [DE] Fed. Rep. of Germany ....... 2815700

[51] Int. Cl.² .................... B01D 9/02; C01B 17/08
[52] U.S. Cl. .................... 422/262; 23/308 S
[58] Field of Search .............. 422/110, 112, 262, 252, 422/284; 23/308 S; 423/578 R, 578 A; 159/26 R, 26 A, 28 C

[56] References Cited

U.S. PATENT DOCUMENTS

| | | | |
|---|---|---|---|
| 1,408,467 | 3/1922 | Perry | 23/308 |
| 1,508,355 | 9/1924 | Thornton | 23/308 S |
| 1,990,602 | 2/1935 | Gvervsey | 23/280 |
| 2,149,373 | 3/1939 | Vincent | 23/308 S |
| 2,253,566 | 8/1941 | Klepetlso | 23/308 S |
| 2,731,332 | 1/1956 | Ackert | 23/308 S |
| 3,072,463 | 1/1963 | Owens | 23/308 S |
| 3,306,446 | 2/1967 | Lewis | 23/308 S |
| 3,607,143 | 9/1971 | Wierman | 23/308 S |
| 3,689,226 | 9/1972 | Stoddard | 23/308 S |
| 3,689,229 | 9/1972 | Lane | 23/280 |

OTHER PUBLICATIONS

Saeman, "Design" I&EC, v53, #8, Aug. 1961, pp. 612-622.

*Primary Examiner*—Hiram H. Bernstein
*Attorney, Agent, or Firm*—Thomas H. Murray; Clifford A. Poff

[57] ABSTRACT

Apparatus for continuously separating sulfur from an aqueous sulfur suspension which is heated above the melting point of sulfur. The apparatus comprises a pressure vessel having heating and stirring devices in its upper part, the lower part of the vessel serving as a settling tank where sulfur is precipitated out of the aqueous solution and withdrawn through an outlet in the bottom of the vessel. Inclined separator plates extend within an outer annular chamber formed between the vessel and heating device. Intermediate the upper and lower parts of the vessel is a substantially horizontal, shallow conical partition which has apertures or slots therein to permit the suspension to pass from the upper part to the lower part. A steam-heated jacket surrounds the vessel. Pressure sensing devices are utilized to maintain the level of the water in the top part and the boundary surface between the water phase and the sulfur phase in the bottom part at desired heights. The pressure sensing devices also control the withdrawal of sludge at the interface between the water phase and sulfur phase as a function of the differential pressure above and below the interface.

8 Claims, 1 Drawing Figure

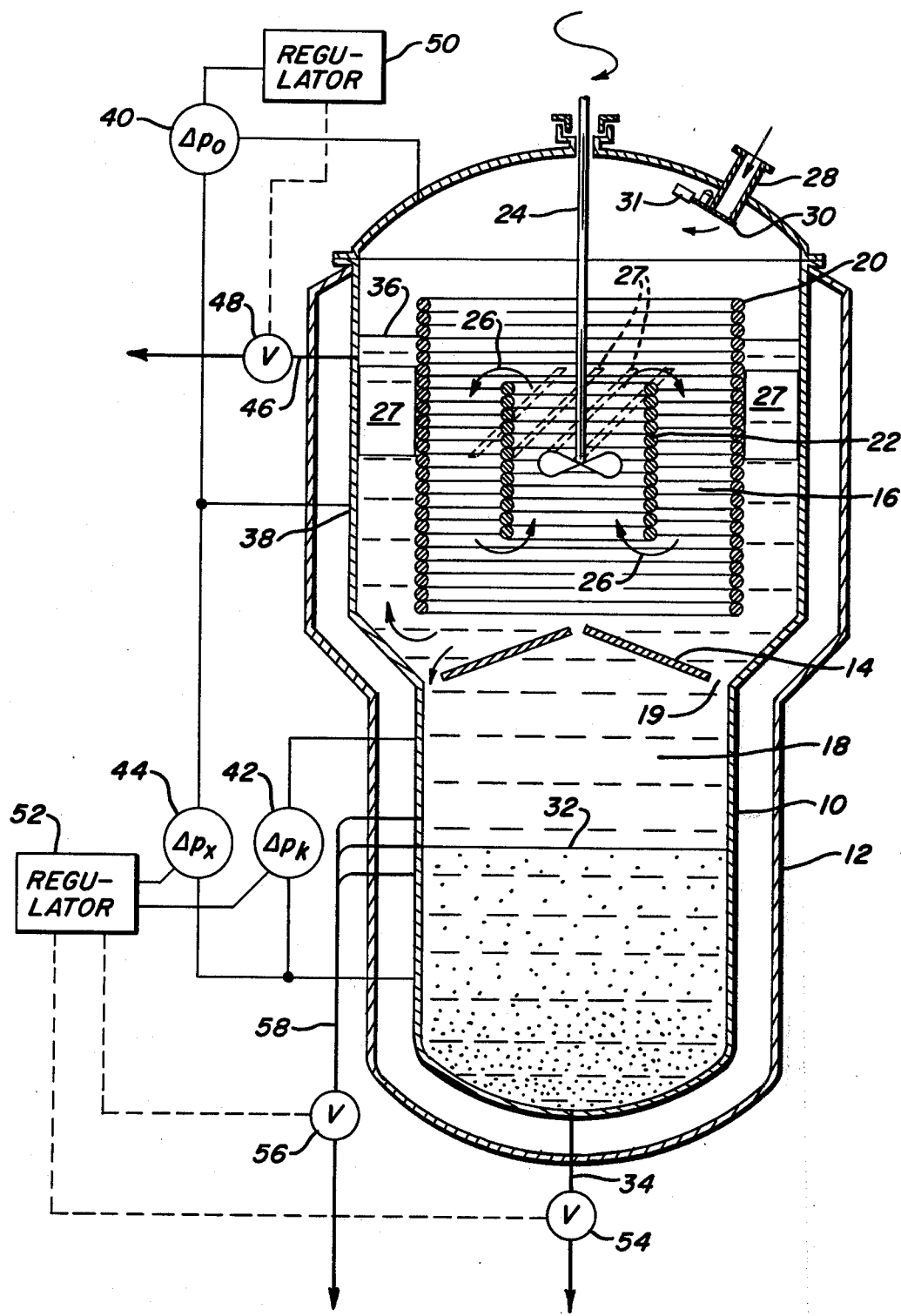

PRESSURE VESSEL FOR SEPARATING SULFUR FROM AN AQUEOUS SULFUR SUSPENSION

CROSS-REFERENCES TO RELATED APPLICATION

This application is a continuation-in-part of application Ser. No. 817,655, filed July 21, 1977, now U.S. Pat. No. 4,158,039.

BACKGROUND OF THE INVENTION

In various methods for desulfurizing industrial gases, for example, the extracted sulfur is finely dispersed in an aqueous suspension and forms a sulfur paste. Elemental sulfur can be obtained from the paste by drying it; however much more energy can be saved, and greater economies practiced, by heating the paste until the sulfur melts, after which the water and sulfur phases are separated in a settling device as a result of their different densities. In order to prevent the water in the paste from evaporating when the sulfur melts (at approximately 113° C.), the melting process must occur at a pressure of 2 to 5 bars in an autoclave. Sulfur-melting autoclaves of this type have been used in the past, but are limited to batch operations, meaning that the individual steps (i.e., pouring in, melting, phase separation and emptying) occur in succession rather than on a continuous basis.

Copending application Ser. No. 817,655, assigned to the Assignee of this invention, is concerned with a pressure vessel for continuously separating sulfur from an aqueous sulfur suspension in a flow-through process. In order to meet practical operating conditions, the operating temperature should be between 120° C. and 150° C. and the pressure should be between 2 and 5 bars. At the upper temperature limit, there is no increase in the viscosity of liquid sulfur, such as occurs at higher temperatures as a result of molecular processes.

The pressure vessel for continuously separating sulfur from an aqueous suspension is divided into an upper part containing a heating and stirring device and a lower part which serves as a settling tank and has a sulfur outlet at its bottom. Intermediate the upper and lower parts is a horizontal, shallow conical partition having apertures or slots therein. Desirably, the upper part and the lower part are surrounded by a steam-heated jacket.

The annular wall of the upper part tapers downwardly in a conical configuration, the partition having apertures or slots therein being disposed at the lower end of the tapered portion. Heating coils are disposed in the top portion; and a heated fluid flows through them. The heating coils are in the form of vertical cylinders, one within the other, and thus divide the top portion of the pressure vessel into annular chambers. The stirring device in the upper portion can be a centrally-disposed, upwardly conveying propeller. The heating coils in the form of vertical cylinders are disposed around the propeller such that when the propeller is in operation, the contents of the pressure vessel circulate around the heating coils. One of the heating coils forms an annular chamber with the outer wall of the upper portion of the pressure vessel. This annular chamber is open at the top and bottom and communicates with an outlet of water separated in the annular chamber.

Devices are provided for measuring the differential pressure between the surface of the water in the upper portion of the pressure vessel and the boundary surface between the water phase and the sulfur phase in the lower part. Regulating devices regulate the withdrawal of water and sulfur in dependence on the pressure at the water surface in the upper portion and the differential pressure at the boundary surface between the water phase and the sulfur phase in the lower portion. Sludge can be removed through conduits placed near the boundary surface between the water phase and the sulfur phase.

During operation, droplets of the molten sulfur collect and sink downwardly because of their greater density while the water rises in the outer annular chamber for discharge from the pressure vessel through a top outlet. The sulfur paste processed in the pressure vessel of this type may also contain very small sulfur particles depending upon the preceding process. The rate of suspension of these particles after melting is below the rate of ascent of the water in the outer annular chamber. The fine sulfur particles are not separated from the water in the vessel in this instance and are discharged from the vessel together with the water through the top outlet.

SUMMARY OF THE INVENTION

It is an object of the present invention to provide an apparatus of the type hereinbefore described for continuously separating sulfur from an aqueous sulfur suspension within a vessel wherein increased separation is achieved through the use of sedimentation surfaces to remove even very fine sulfur particles or droplets from an aqueous phase before discharge from a pressure vessel wherein the separation process is carried out.

It is a further object of the present invention to provide separator members having inclined sedimentation surfaces disposed within an outer annular chamber in a pressure vessel to effectively remove droplets of sulfur from an aqueous suspension and thereby greatly improve the sedimentation process in an economical manner without the need to increase the physical size of the pressure vessel.

The basic objective of this invention is to insure that even very fine sulfur droplets are separated from an aqueous suspension during the process of separating sulfur from an aqueous sulfur suspension. Conceptionally, very fine sulfur droplets suspended in an aqueous fraction in the outer annular chamber of a separator of the type hereinbefore described can be separated from an aqueous fraction by increasing the size of the annular chamber. The increase in size of the annular chamber reduces the flow rate of ascending water to such an extent that it is possible to maintain the flow rate below the rate of suspension of even the fine sulfur particles. However, the size of such a pressure vessel would be excessively large to such an extent that at least the top part thereof is not economically feasible to produce.

To achieve the objectives of the present invention, it has been discovered that the separation process carried out in the outer annular chamber of a separator, i.e., the space between the pressure jacket and the outer heating coil, can be greatly increased without increasing the diameter of the pressure vessel by providing a ring of inclined separator plates within the outer annular chamber. The projected horizontal surfaces of the separator plates greatly improve the sedimentation process.

The above and other objects and features of the invention will become apparent from the following detailed description taken in connection with the accompanying single FIGURE drawing which forms a part of this specification.

With reference now to the drawing, the pressure vessel shown is provided with an inner wall 10 surrounded by an outer wall 12 forming a jacket which may be heated by steam. A shallow conical partition 14 divides the vessel into an upper portion 16 and a lower 18. The conical partition 14 has a radius less than the inner wall of the lower portion 18. As a consequence, an annular opening or slit 19 is left between the outer periphery of the partition 14 and the inner wall of the lower portion of the pressure vessel.

Two groups 20 and 22 of heating coils are disposed in the upper portion 16 and form vertical cylinders, thus dividing the upper portion 16 into individual annular chambers. A stirring device comprising a propeller 24 is disposed within the inner coil 22 and drives the liquid in the vessel in a circular pattern as shown by arrows 26. Separator plates 27 have inclined face surfaces for sedimentation surfaces within the outer annular chamber between the inner wall 10 and heating coil 20. The plates 27 are disposed in this chamber in the form of a ring.

Sulfur paste is introduced into the pressure vessel through a nozzle 28 fitted with a gravity valve 30 which will open under the weight of the sulfur paste but will thereafter close due to the weight of a counterweight 31. After the sulfur paste is poured into the pressure vessel, it gradually heats up and the suspended sulfur melts. The molten sulfur then collects in drops which, owning to their greater weight, sink downwardly and flow into the lower portion or settling chamber 18 through the annular space 19 between the inner wall of the pressure vessel and the partition 14.

In the lower settling chamber 18, the fluid is substantially stagnant with the result that phase separation proceeds undisturbed as a result of gravity; and a boundary surface 32 forms between the sulfur paste, at the bottom, and water above it. The height of the surface 32 can be kept constant by continuously or intermittently withdrawing molten sulfur through an outlet 34 at the bottom of the pressure vessel.

A pressure sensing device 40 is provided for measuring the differential pressure $\Delta P_o$ between the gas and water in the upper portion 16. That is, the difference in pressure between the air above the level 36 of the paste suspension and the hydrostatic pressure at point 38 is measured by the pressure sensing device 40. Similarly, the pressure differential $\Delta P_k$ between the water phase above the boundary surface 32 and the sulfur phase beneath is measured by a pressure sensing device 42. Finally, the difference in pressure $\Delta P_x$ between point 38 and the sulfur phase beneath the boundary surface 32 is measured by pressure sensing device 44.

It will be noted that slightly below the level 36 in the upper portion 16 is a conduit 46 containing a control valve 48 which is, in turn, controlled by a regulator 50 connected to the differential pressure sensing device 40. The arrangement is such that as the level 36 rises to a predetermined height, the pressure differential sensed by sensing device 40 will rise to the point where the regulator 50 opens the valve 48 to permit excess water, from which sulfur has been separated, to drain off. The water discharged through valve 48 is free of even very fine sulfur droplets because of the sedimentation provided by plates 27. The differential pressure sensing devices 42 and 44 are connected to a regulator 52 which, in turn, controls valves 54 and 56. The valve 54 controls the discharge of sulfur through conduit 34. Regulator 52 is used to control valve 54 as a function of the pressure differential $\Delta P_x$, this differential being an indication of the height of the sulfur phase beneath surface 32. The valve 56, on the other hand, controls the discharge of sludge forming at the boundary surface 32 through conduit 58. In this respect, the two differential pressures $\Delta P_x$ and $\Delta P_k$ can, by calibration, each be associated with given heights of the phase boundary surface 32. During normal operations, the measurements for $\Delta P_x$ and $\Delta P_k$, derived by calibration, will give the same values for the proper height of the phase boundary surface 32. However, if the differential pressure values measured by devices 42 and 44 should become different, the difference indicates that a layer having a different density (usually dirt and sludge) has formed in the neighborhood of the boundary surface 32. If this should occur (i.e., a difference in the differential pressure measurements sensed by devices 40 and 42), the valve 56 is opened to withdraw the sludge through conduit 58.

The pressure vessel of the invention operates at a pressure between 2 and 5 bars, with a water temperature of 120° C. to 150° C. Preferably, the coils 20 and 22 and the surrounding steam jacket are heated by saturated steam at a temperature between 125° C. and 155° C. The outer steam jacket also prevents the vessel walls from cooling unacceptably to the point where the sulfur solidifies thereon and forms a layer.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for continuously separating sulfur from an aqueous sulfur suspension which is heated above the melting point of sulfur, comprising a pressure vessel having heating and stirring means in its upper portion, said heating and stirring means comprising inner and outer annular coaxial heating coils extending vertically along said upper portion defining two annular chambers and propeller means coaxially disposed within the space surrounded by said inner heating coil for causing the contents of said upper portion to circulate around at least the inner heating coil, separator means having inclined sedimentation surfaces disposed within the outer chamber of said annular chambers between said outer annular heating coil and the wall of said pressure vessel, the lower portion of the vessel serving as a settling tank and having an outlet for separated sulfur at its bottom, means to introduce an aqueous sulfur suspension into the upper portion of the vessel, and a substantially horizontal, shallow conical partition located between the upper and lower portions and beneath said heating and stirring means, the side wall of the vessel defining with said partition at least one opening to pass therethrough an aqueous sulfur suspension from the upper portion into the lower portion of the vessel.

2. The apparatus according to claim 1 wherein said separator members include plates having inclined face surfaces.

3. The apparatus according to claim 1 wherein said separator members include a ring of inclined separator plates.

4. The apparatus of claim 1 wherein said opening comprises an annular space between the outer periphery of said partition and the inner wall of said vessel.

5. The apparatus of claim 1 including a steam jacket surrounding the upper and lower portions of said pressure vessel.

6. The apparatus of claim 1 wherein said propeller means comprises an upwardly-conveying propeller.

7. The apparatus of claim 1 including means for measuring the difference in pressure between the air above said sulfur suspension in the upper portion of said pressure vessel and a point beneath the level of said suspension in the upper portion, and means for draining liquid from said upper portion when the difference in pressure thus measured indicates that the level has risen above a predetermined height.

8. The apparatus of claim 1 wherein the sulfur separating from the aqueous suspension in said lower portion of the pressure vessel forms a phase boundary between a sulfur phase at the bottom and a water phase above, said apparatus further including means for measuring the difference in pressure between a point in the sulfur phase and a point in the aqueous suspension in said upper portion of the pressure vessel, and means for withdrawing sulfur from the bottom of said pressure vessel in dependence upon the difference in pressures thus measured, said difference being an indication of the height of the sulfur phase in said lower portion of the pressure vessel.

* * * * *